United States Patent
Pan et al.

(10) Patent No.: US 9,966,857 B2
(45) Date of Patent: May 8, 2018

(54) AC-TO-DC POWER CONVERTER AND CONTROL METHOD AND CONTROL INTEGRATED CIRCUIT THEREOF

(71) Applicant: Richtek Technology Corporation, Chupei, Hsinchu (TW)

(72) Inventors: Jiun-Hung Pan, Taipei (TW); Chien-Fu Tang, Hsinchu (TW); Jyun-Che Ho, Xikou Township, Chiayi County (TW); Isaac Y. Chen, Jubei (TW); Yu-Chang Chen, Jiji Township, Nantou County (TW); Jung-Pei Cheng, Huatan Township, Changhua County (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 0 days. days.

(21) Appl. No.: 15/192,187

(22) Filed: Jun. 24, 2016

(65) Prior Publication Data

US 2016/0308449 A1    Oct. 20, 2016

Related U.S. Application Data

(63) Continuation of application No. 13/973,168, filed on Aug. 22, 2013, now abandoned.

(30) Foreign Application Priority Data

Aug. 23, 2012 (TW) .............................. 101130683 A

(51) Int. Cl.
| | |
|---|---|
| *H02M 3/156* | (2006.01) |
| *H02M 3/335* | (2006.01) |
| *H02M 7/217* | (2006.01) |
| *H02M 1/08* | (2006.01) |
| *H02M 3/157* | (2006.01) |
| *H02M 1/00* | (2006.01) |

(52) U.S. Cl.
CPC ......... *H02M 3/33507* (2013.01); *H02M 1/08* (2013.01); *H02M 3/156* (2013.01); *H02M 3/33515* (2013.01); *H02M 7/217* (2013.01); *H02M 3/157* (2013.01); *H02M 3/33523* (2013.01); *H02M 2001/0009* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523
USPC .. 363/20, 21.04, 21.05, 21.07, 21.08, 21.09, 363/21.1, 21.11, 21.123, 21.15, 21.16, 363/21.17, 21.18
See application file for complete search history.

(56) References Cited

U.S. PATENT DOCUMENTS

| | | |
|---|---|---|
| 5,107,190 A | 4/1992 | Schultz et al. |
| 6,385,061 B1 | 5/2002 | Turchi et al. |

(Continued)

*Primary Examiner* — Timothy J Dole
*Assistant Examiner* — Bryan R Perez
(74) *Attorney, Agent, or Firm* — Muncy, Geissler, Olds & Lowe, P.C.

(57) ABSTRACT

An AC-to-DC power converter with a BJT as a power switch can set a base current of the BJT by a current setting resistor which is in the outside of a control integrated circuit. Since an output current and a recovery current of the BJT are injected into a sensing resistor, the AC-to-DC power converter can correctly detect an inductor current thereof from the sensing resistor.

31 Claims, 19 Drawing Sheets

(56) References Cited

U.S. PATENT DOCUMENTS

| | | |
|---|---|---|
| 7,030,668 B1 | 4/2006 | Edwards |
| 7,538,525 B2 | 5/2009 | Kim et al. |
| 7,961,484 B2 | 6/2011 | Lalithambika et al. |
| 8,045,348 B2 | 10/2011 | Zhu et al. |
| 8,576,586 B2 | 11/2013 | Zheng et al. |
| 2009/0040796 A1 | 2/2009 | Lalithambika et al. |
| 2009/0147546 A1 | 6/2009 | Grande et al. |
| 2009/0279333 A1 | 11/2009 | Zhu et al. |
| 2010/0202165 A1 | 8/2010 | Zheng et al. |
| 2011/0032734 A1 | 2/2011 | Melanson |
| 2011/0102063 A1 | 5/2011 | Zeller |
| 2011/0194313 A1 | 8/2011 | Yoshinaga |
| 2011/0261596 A1* | 10/2011 | Zong ................ H02M 3/33507 363/21.13 |

* cited by examiner

AC-TO-DC POWER CONVERTER AND CONTROL METHOD AND CONTROL INTEGRATED CIRCUIT THEREOF

CROSS-REFERENCE TO RELATED APPLICATIONS

This application is a Continuation of co-pending application Ser. No. 13/973,168 filed on Aug. 22, 2013, for which priority is claimed under 35 U.S.C. § 120; and this application claims priority of Application No. 101130683 filed in Taiwan on Aug. 23, 2012 under 35 U.S.C. § 119, the entire contents of all of which are hereby incorporated by reference.

FIELD OF THE INVENTION

The present invention is related generally to an AC-to-DC power converter and, more particularly, to an AC-to-DC power converter with a bipolar junction transistor (BJT) as a power switch.

BACKGROUND OF THE INVENTION

Recently, with the consideration of costs, in some AC-to-DC power converters, a BJT is used instead of a metal-oxide-semiconductor field-effect transistor (MOSFET) as the power switch, such as those described in U.S. Pat. Nos. 8,045,348 and 7,961,484 and U.S. Pat. Application Publication No. 2010/0202165.

BJT driving technique includes two types, namely base driving (BD) and emitter driving (ED). FIG. 1 shows an AC-to-DC power converter using BD technique, in which a rectifier circuit 10 rectifies an alternating current (AC) voltage VAC to generate an input voltage Vin, in a BJT Q1, a collector works as an input terminal connected to an inductor Np, and an emitter works as an output terminal connected to sensing resistor Rcs, and a control integrated circuit (IC) 12 has a pin Output connected to a base of the BJT Q1 and providing a base current Ib to switch the BJT Q1 to convert the input voltage Vin into an output voltage Vo. The control IC 12 further has a pin Isense connected to a sensing resistor Rcs for detecting an output current Ie of the BJT Q1. When the BJT Q1 is on, the inductor current Ic of the inductor Np raises. Ideally, the inductor current Ic is close to the current Ie, so that the control IC 12 can determine the inductor current Ic according to the voltage Vcs at the sensing resistor Rcs, and turn off the BJT Q1 when the inductor current Ic reaches a predetermined peak. In addition, the internal circuit of the control IC 12 can also set the base current Ib according to the voltage Vcs. However, the control IC 12 can only provide the base current Ib in a fixed range. Once the required base current Ib is not within the fixed range, the optimal performance becomes unachievable.

FIG. 2 shows an AC-to-DC power converter using another BD technique, in which a rectifier circuit 10 rectifies an AC voltage VAC to generate an input voltage Vin, a control IC 14 has a pin Base connected to the base of a BJT Q1 to switch the BJT Q1 and thereby convert the input voltage Vin into an output voltage Vo, and a current-setting resistor Rset is connected between pins VDD and VDD-B. The current-setting resistor Rset generates a base current Ib for the control IC 14 according to a voltage drop therein. FIG. 3 shows the control IC 14 as shown in FIG. 2, which includes switches SW1 and SW2 and a driver 16. When the driver 16 turns on the switch SW1 and turns off the switch SW2, as shown at the time t1 in FIG. 4, the current-setting resistor Rset generates a base current Ib for the base of the BJT Q1 to turn on the BJT Q1. The increase of the inductor current Ic induces the increase of the voltage Vcs of the sensing resistor Rcs. When the voltage Vcs reaches a predetermined threshold, the driver 16 turns off the switch SW1 and turns on the switch SW2 to turn off the BJT Q1, as shown at the time t2 in FIG. 4. In this AC-to-DC power converter, the base current Ib of the BJT Q1 is determined by the current-setting resistor Rset outside the control IC 14, so a user may select an appropriate current-setting resistor Rset for the base current Ib as desired. However, an additional pin VDD-B is needed for this purpose. Furthermore, one characteristic of BJT is that when the BJT Q1 is turned off, the output current Ie of the BJT Q1 ends, but BJT Q1 will generate a recovery current Irb that flow to the base of the BJT Q1 from its collector. This causes the inductor current Ic of the collector of the BJT Q1 remains going up for a period of time after the current Ie ends, as happening during the tome period between time points t2 and t3 in FIG. 4, making the voltage Vcs of the sensing resistor Rcs unable to represent the inductor current Ic, and hindering the control IC 14 from getting the correct inductor current Ic by referring to the voltage Vcs.

FIG. 5 shows an AC-to-DC power converter using ED technique, in which a rectifier circuit 10 rectifies an AC voltage VAC to generate an input voltage Vin, a control IC 18 has a pin ED connected to the emitter of a BJT Q1 to switch the BJT Q1 and thereby convert the input voltage Vin into an output voltage Vo, a current-setting resistor Rset has one terminal connected to the base of the BJT Q1, and another terminal connected to the base of a BJT Q2, and thus, by selecting the current-setting resistor Rset, the base current Ib may be obtained as desired. The control IC 18 has a pin GND connected to a first terminal 20 of the sensing resistor Rcs and determining a reference potential for the control IC 18 according to the voltage Vgnd thereon, and has another pin CS connected to a second terminal 22 of the sensing resistor Rcs, so that the control IC 18 can determine the inductor current Ic of an inductor Np according to the voltage drop Vcs−Vgnd in the sensing resistor Rcs. FIG. 6 shows the control IC 18 shown in FIG. 5, which includes a switch SW3 connected between pins ED and GND, and a driver 24 for controlling the switch SW3. When the driver 24 turns on switch SW3, the current-setting resistor Rset generates the base current Ib according to the base voltage V2 to turn on the BJT Q1, as shown at time t1 in FIG. 7. The inductor current Ic at the collector of the BJT Q1 and the output current Ie of the BJT Q1 accordingly raise. At this time, the current Ie passes through the sensing resistor Rcs. Since the voltage Vgnd at the first terminal 20 of the sensing resistor Rcs is the reference potential for the control IC 18, from the perspective of the control IC 18, the voltage Vcs−Vgnd=−Ie×Rcs at the pin CS has a negative value, as shown by the waveform of Vcs−Vgnd shown in FIG. 7. When the voltage Vcs−Vgnd reaches the predetermined threshold, the driver 24 turns off the switch SW3 to turn off the BJT Q1, as shown at time t2 in FIG. 7. However, as stated previously, when the BJT Q1 is turned off, the BJT Q1 will generate the recovery current Irb that makes the voltage drop Vcs−Vgnd of the sensing resistor Rcs unable to represent the inductor current Ic, as happening during the time period between the time points t2 and t3 in FIG. 7. This hinders the control IC 18 from getting correct inductor current Ic by referring to the voltage drop Vcs−Vgnd of the sensing resistor Rcs.

Additionally, each of the AC-to-DC power converters shown in FIG. 1, FIG. 2 and FIG. 5 determines the inductor current Ic according to the voltage Vcs of the sensing resistor Rcs, and turns off the BJT Q1 when the inductor current Ic reaches the predetermined peak Ipeak. However, between the time that the inductor current Ic reaches time predetermined peak Ipeak and the time that the BJT Q1 is turned off, a delay time Td is caused by the charge stored when the BJT was on, as shown in FIG. 8. The delay time Td makes the peak of the inductor current Ic goes beyond the predetermined peak Ipeak. Moreover, the slop of the inductor current Ic varies with the input voltage Vin. When the input voltage Vin is low, the slops of the inductor current Ic is relatively small, and the peak error $\Delta I1$ is relatively small, as shown by the waveform 26 in FIG. 8. When the input voltage Vin is high, the slope of the inductor current Ic is relatively large, and the peak error $\Delta I2$ is relatively large, as shown by the waveform 28 in FIG. 8.

SUMMARY OF THE INVENTION

An objective of the present invention is to provide an AC-to-DC power converter and a control method thereof, wherein the base current is set from the outside of a control IC.

Another objective of the present invention is to provide an AC-to-DC power converter and a control method thereof, wherein the inductor current can be correctly detected.

Yet another objective of the present invention is to provide an AC-to-DC power converter and a control method thereof, wherein the delay time is compensated.

A further objective of the present invention is to provide a control IC of an AC-to-DC power converter.

According to the present invention, an AC-to-DC power converter having a BJT as a power switch includes a control IC and a current-setting resistor connected to a pin of the control IC. The control IC detects the resistance value of the current-setting resistor to determine the base current of the BJT. The control IC includes a base-current-setting circuit and a current source. The base-current-setting circuit detects the resistance value of the current-setting resistor to generate a current-controlling signal. When the BJT is on, the current source generates the base current according to the current-controlling signal.

According to the present invention, an AC-to-DC power converter having a BJT as a power switch includes a control IC and a sensing resistor. An output current at the output terminal of the BJT and the recovery current of the BJT pass through the sensing resistor. The control IC can correctly determine the inductor current of an inductor connected to the BJT according to the voltage drop of the sensing resistor.

According to the present invention, an AC-to-DC power converter includes a power switch, an inductor connected to the power switch, a sensing resistor generating a first voltage at its first terminal and generating a second voltage at its second terminal according to the current of the power switch, a shifting circuit shifting the second voltage to compensate the delay time, and a control IC determining the inductor current of the inductor according to a relative voltage between the first voltage and the shifted second voltage.

According to the present invention, a control method of an AC-to-DC power converter having a BJT as a power switch includes detecting the resistance value of a current-setting resistor to generate a current-controlling signal, and determining a base current to be provided to a BJT according to the current-controlling signal.

According to the present invention, a control method of an AC-to-DC power converter having a BJT as a power switch, includes when a power switch is on, providing an output current at the output terminal of the power switch to a sensing resistor to generate a first voltage and a second voltage at a first terminal and a second terminal of the sensing resistor, respectively; shifting the second voltage to compensate a delay time; detecting a relative voltage between the first voltage and the shifted second voltage; and when the relative voltage reaches a predetermined threshold, turning off the power switch.

BRIEF DESCRIPTION OF THE DRAWINGS

These and other objectives, features and advantages of the present invention will become apparent to those skilled in the art upon consideration of the following description of the preferred embodiments according to the present invention taken in conjunction with the accompanying drawings, in which.

DETAILED DESCRIPTION OF THE INVENTION

Figure 1:
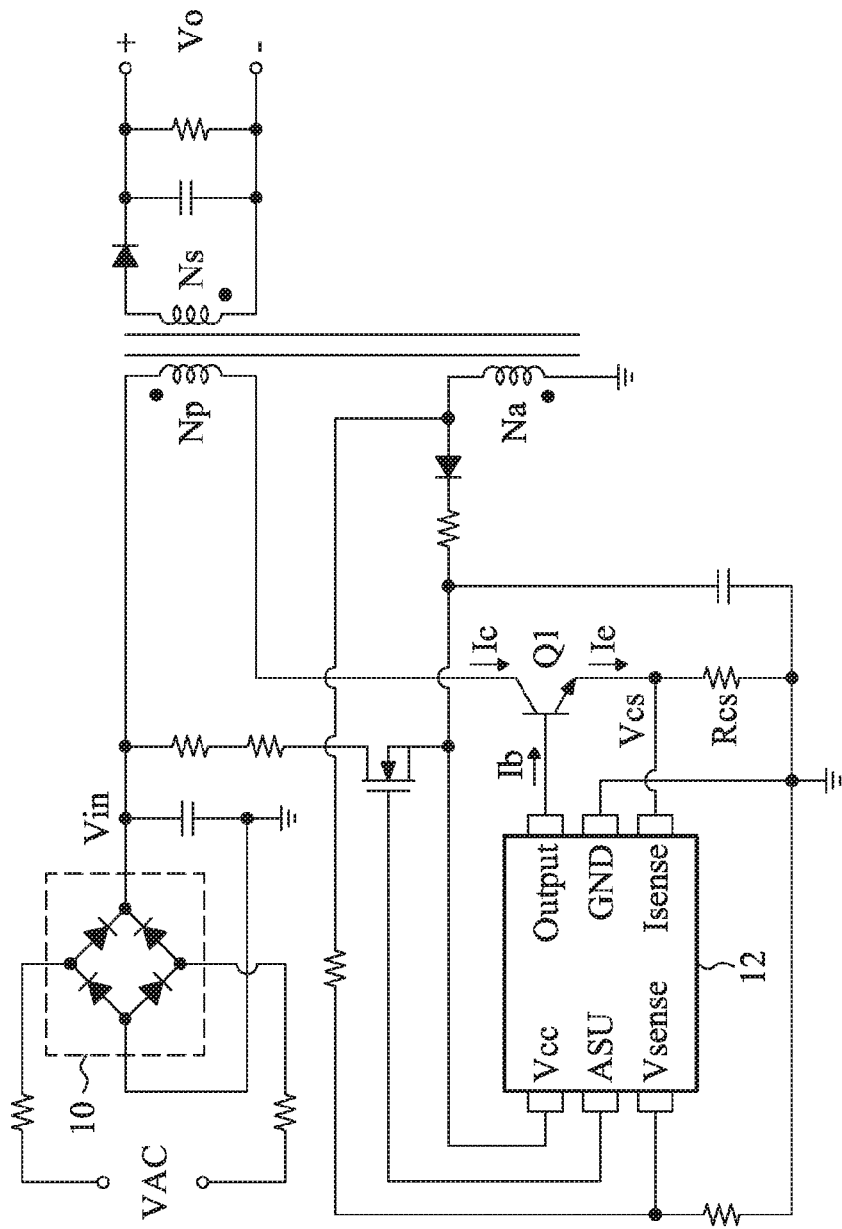
FIG. 1 is an AC-to-DC power converter using BD technique.
Figure 2:
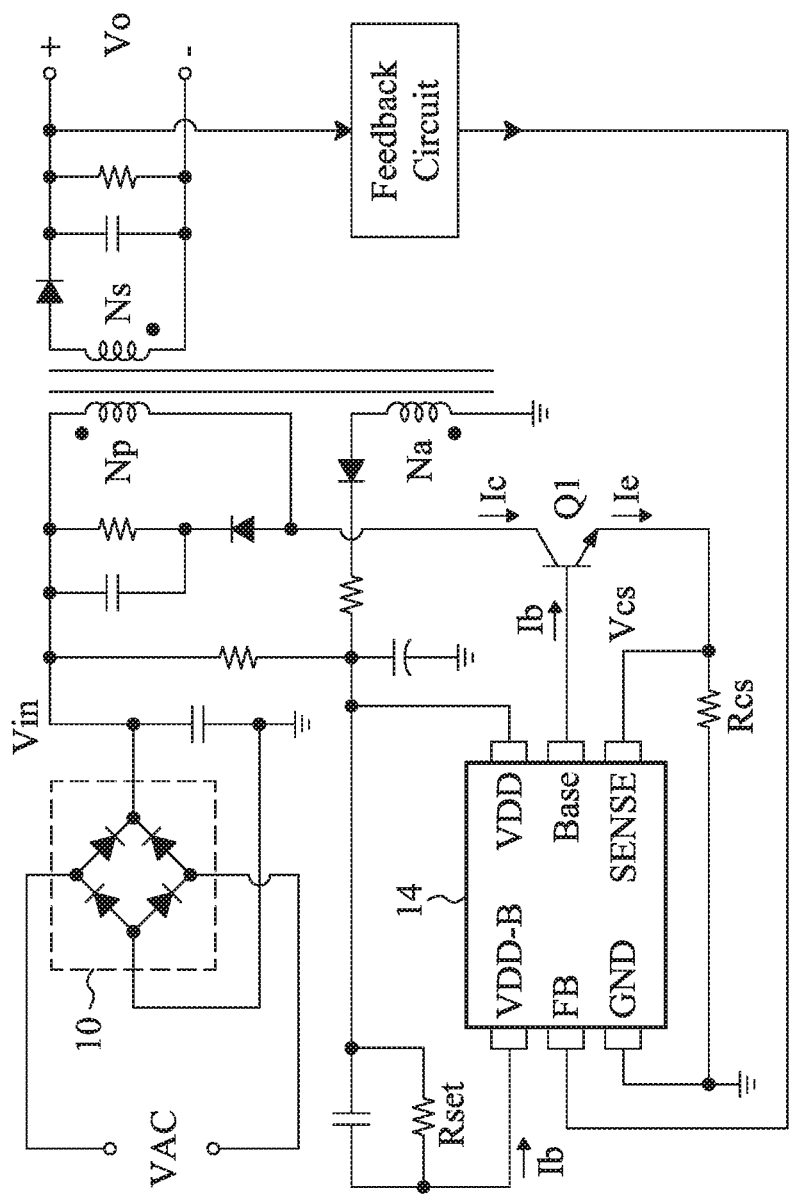
FIG. 2 is an AC-to-DC power converter using another BD technique.
Figure 3:
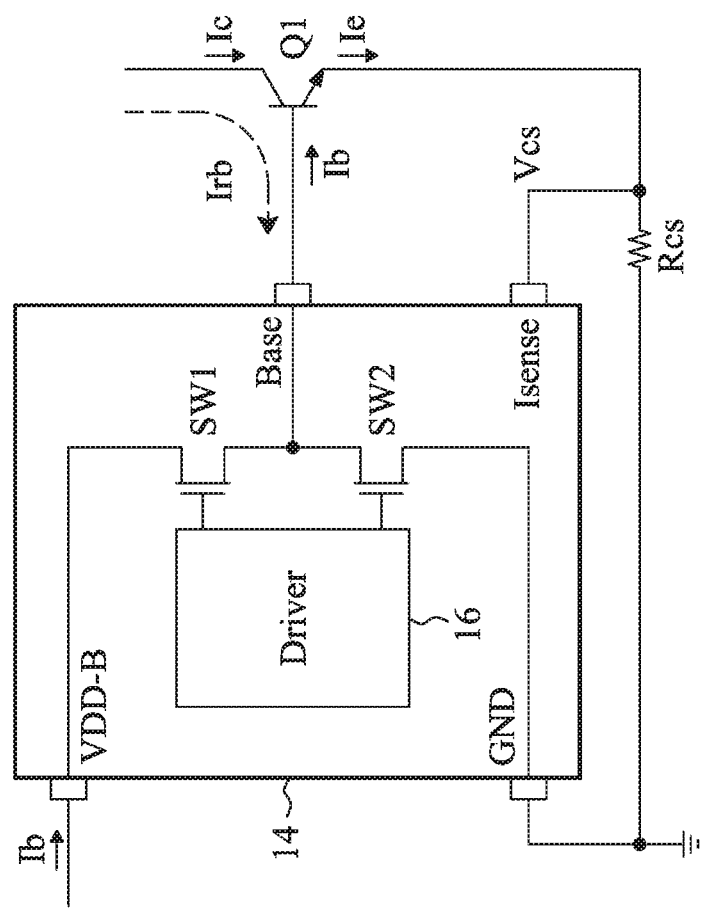
FIG. 3 is the control IC shown in FIG. 2.
Figure 4:
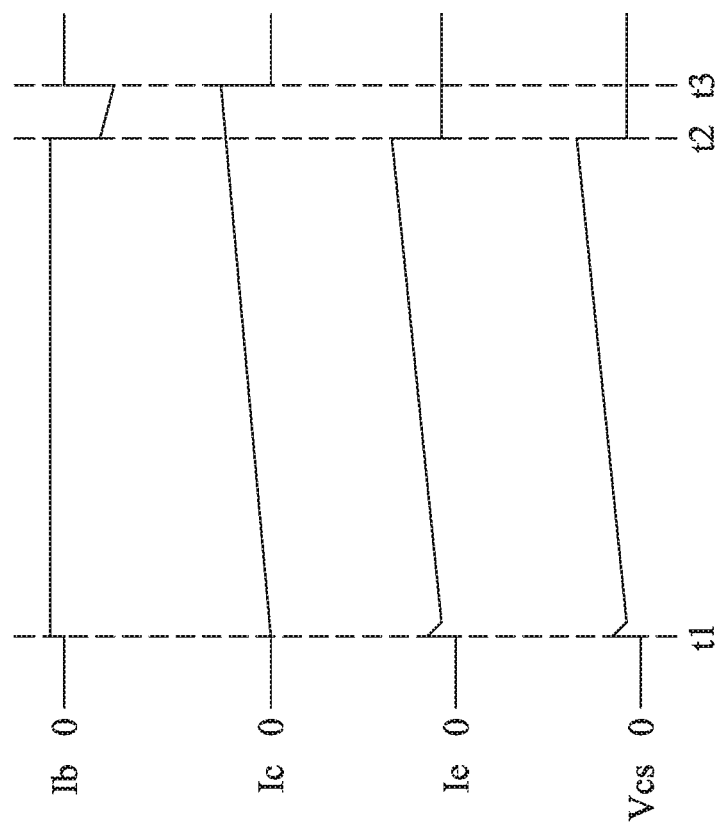
FIG. 4 shows waveforms of the signals shown in FIG. 2.
Figure 5:
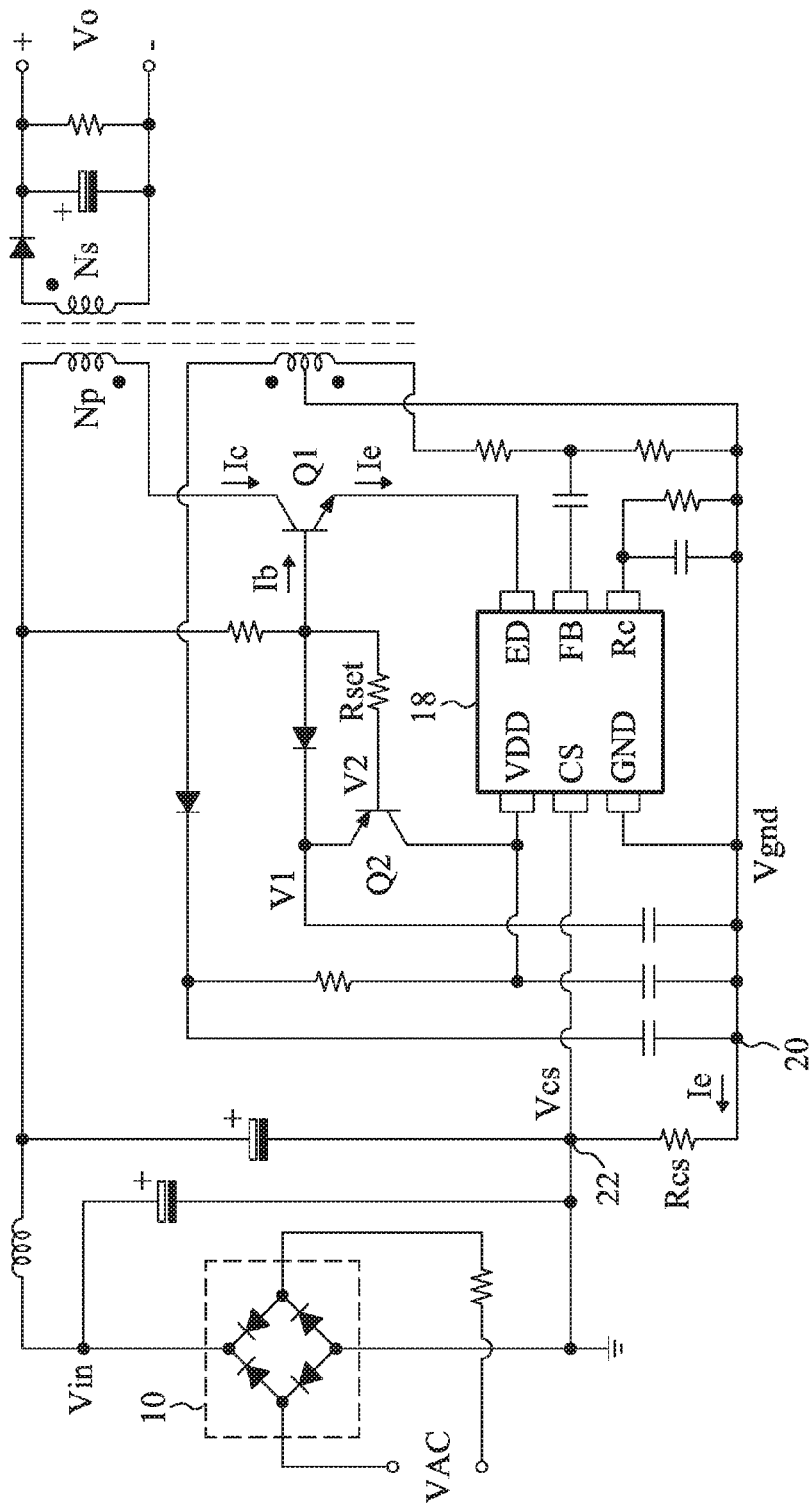
FIG. 5 is an AC-to-DC power converter using ED technique.
Figure 6:
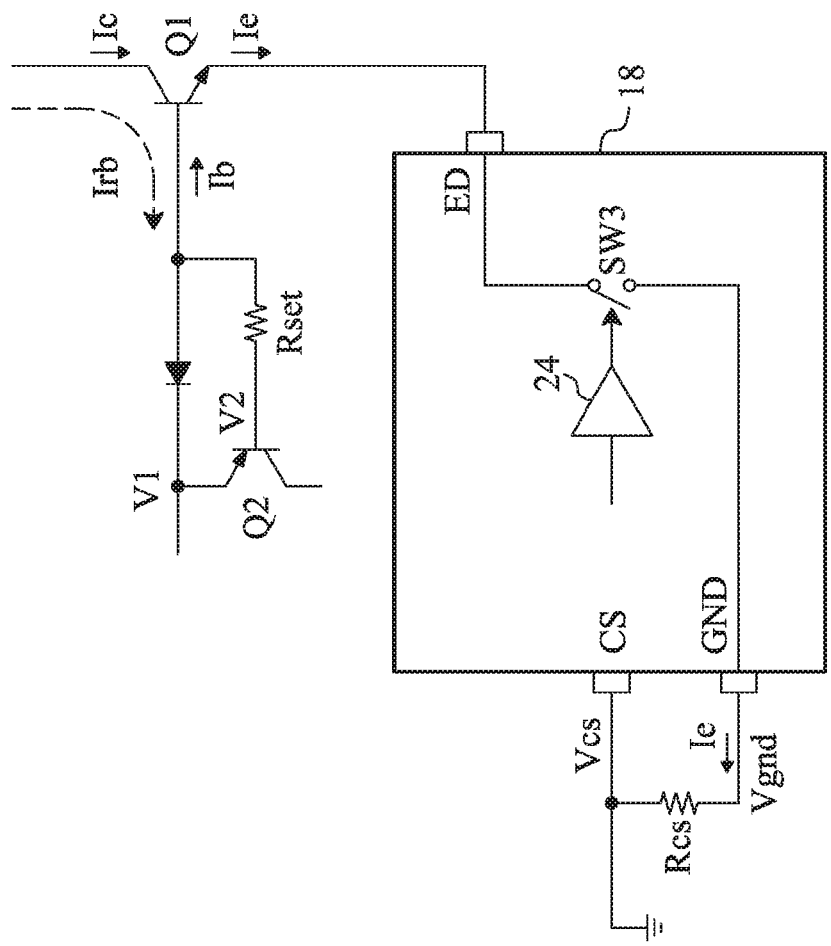
FIG. 6 shows the control IC shown in FIG. 5.
Figure 7:
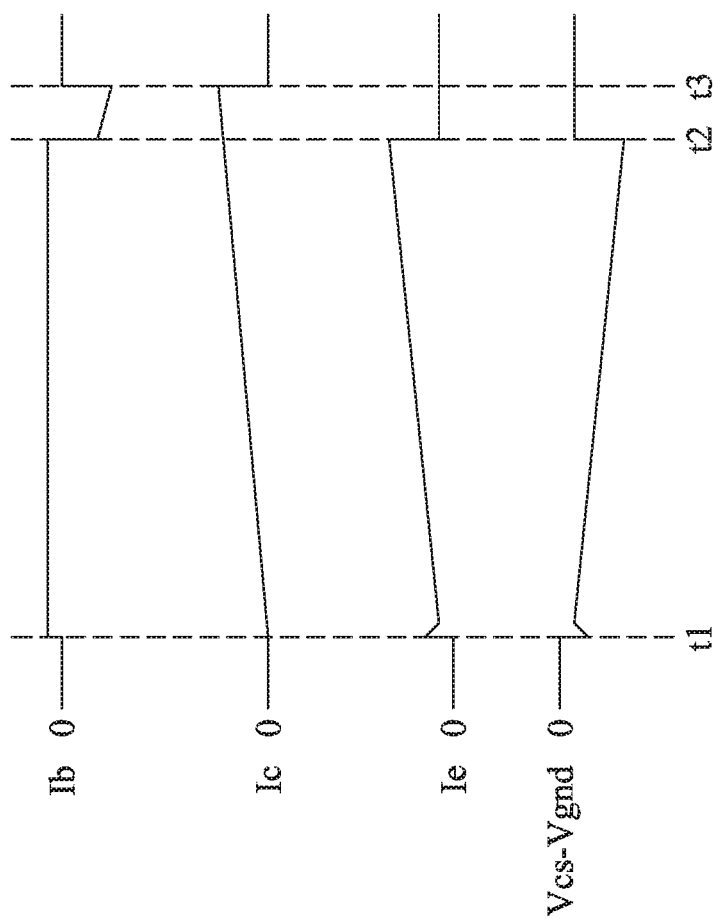
FIG. 7 shows waveforms of the signals shown in FIG. 5.
Figure 8:
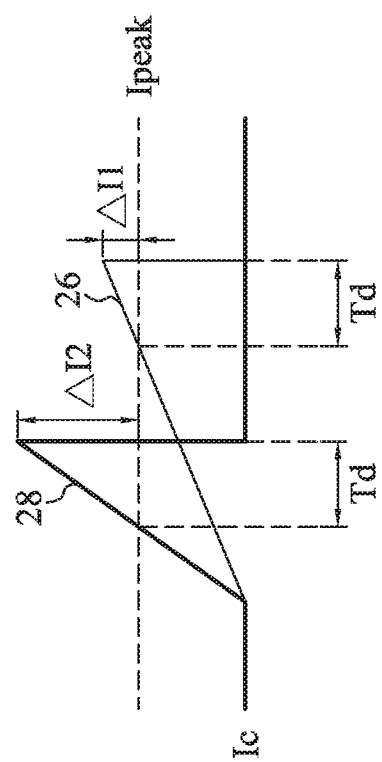
FIG. 8 shows different inductor currents Ic under different input voltages.
Figure 9:
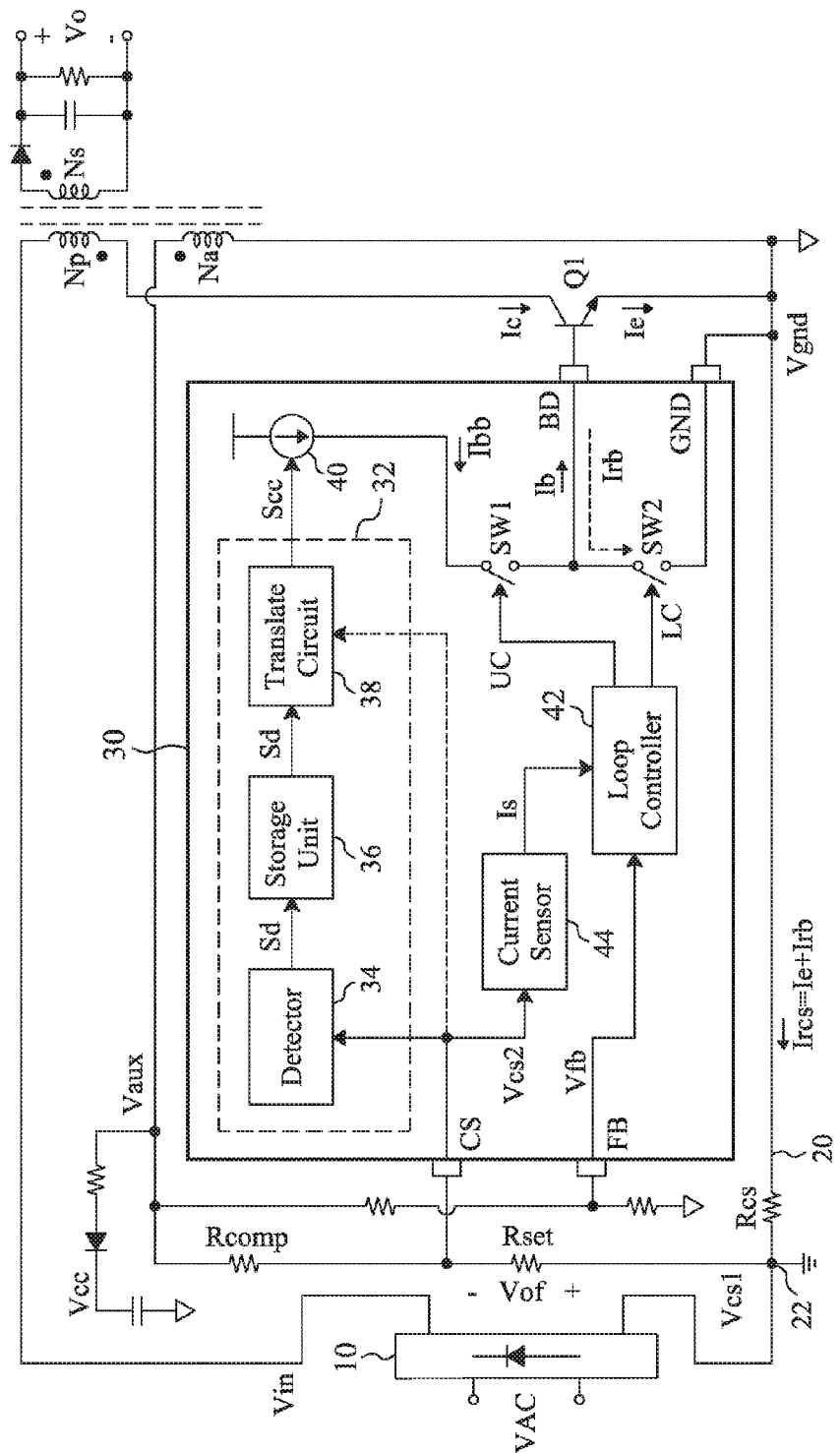
FIG. 9 is an AC-to-DC power converter according to the present invention.

FIG. 9 shows a fly-back AC-to-DC power converter according to the present invention, in which a rectifier circuit 10 rectifies an AC voltage VAC to generate an input voltage Vin, a BJT Q1 works as a power switch, and a control IC 30 has a pin BD connected to a base of the BJT Q1 to switch the BJT Q1 in order to convert the input voltage Vin into an output voltage Vo. The BJT Q1 has its collector working as an input terminal connected to an inductor and receiving an inductor current Ic and has its emitter working as an output terminal for providing an output current Ie. A current-setting resistor Rset is connected to a pin CS of the control IC 30 to set the base current Ib. The control IC 30 has its pin GND connected to a first terminal 20 of a sensing resistor Rcs. The reference potential for the control IC 30 is determined by a voltage Vgnd at the first terminal 20. The sensing resistor Rcs has a second terminal 22 connected to the pin CS through the current-setting resistor Rset. In the control IC 30, the base-current-setting circuit 32 is connected to the pin CS. During the duration of setting the base current Ibb, as the period between the time points T1 and T2 in FIG. 10, the base-current-setting circuit 32 detects the resistance value of the current-setting resistor Rset to generate and store a current-controlling signal Scc. A current source 40 provides the base current Ibb according to the current-controlling signal Scc. A loop controller 42 provides control signals UC and LC to control the switches SW1 and SW2, respectively, in order to switch the BJT Q1. A current sensor 44 detects a relative voltage Vcs2−Vgnd between the voltage Vcs2 of the pin CS and the voltage Vgnd of the pin GND, to determine the value of the inductor current Ic. The base-current-setting circuit 32 may set the base current Ibb only one time when the AC-to-DC power converter is activated. Alternatively, it can reset the base current Ibb once for every switching cycle of the BJT Q1. Preferably, when the BJT Q1 is turned on, the base-current-setting circuit 32 immediately adjusts the current-controlling signal Scc according to the voltage Vcs2 of the pin CS, thereby adjusting the base current Ibb. The base-current-setting circuit 32 sets the base current Ibb by using the pin CS that senses the inductor current Ic, so there are no additional pins needed.

When the loop controller 42 turns on the switch SW1 and turns off the switch SW2, the current source 40 provides the base current Ibb to the base of the BJT Q1 to turn on the BJT Q1. The inductor current Ic of the secondary side and the output current Ie of the BJT Q1 raise, as shown at the time point T2 in FIG. 10, and the current Ircs=Ie+Irb passing through the sensing resistor Rcs raises with the current Ie. Thus, according to the voltage drop of the sensing resistor Rcs, the value of the inductor current Ic can be obtained. A shifting circuit composed of resistors Rcomp and Rset provides a voltage Vof to shift the voltage Vcs1 at the second terminal of the sensing resistor Rcs to generate a voltage Vcs2 for the pin CS. The current sensor 44, according to the relative voltage Vcs2−Vgnd between the voltage Vcs2 of the pin CS and the voltage Vgnd of the pin GND, determines the value of the inductor current Ic. The shifted voltage Vcs2 will make the current sensor 44 send out the current-sensing signal Is to the loop controller 42 to turn off the BJT Q1 before the inductor current Ic reaches the predetermined peak Ipeak, thereby compensating the peak error caused by the delay time Td. In the embodiment, the voltage Vcs2 is smaller than the voltage Vgnd, so the relative voltage Vcs2−Vgnd=−Ircs×Rcs is a negative voltage. The resistors Rcomp and Rset divide the voltage Vaux of the auxiliary coil Na, to generate a voltage drop Vof=[Rset/(Rset+Rcomp)]×Vaux on the resistor Rset. By appropriately selecting the ratio between the resistors Rcomp and Rset to adjust the voltage Vof, it is possible to make the peak of the inductor current Ic equal to the predetermined peak Ipeak. Additionally, when the BJT Q1 is on, the voltage Vaux of the auxiliary coil Na varies with the input voltage Vin, so the voltage Vof varies with the input voltage Vin, thereby compensating the peak error as the input voltage Vin varies.

Figure 10:
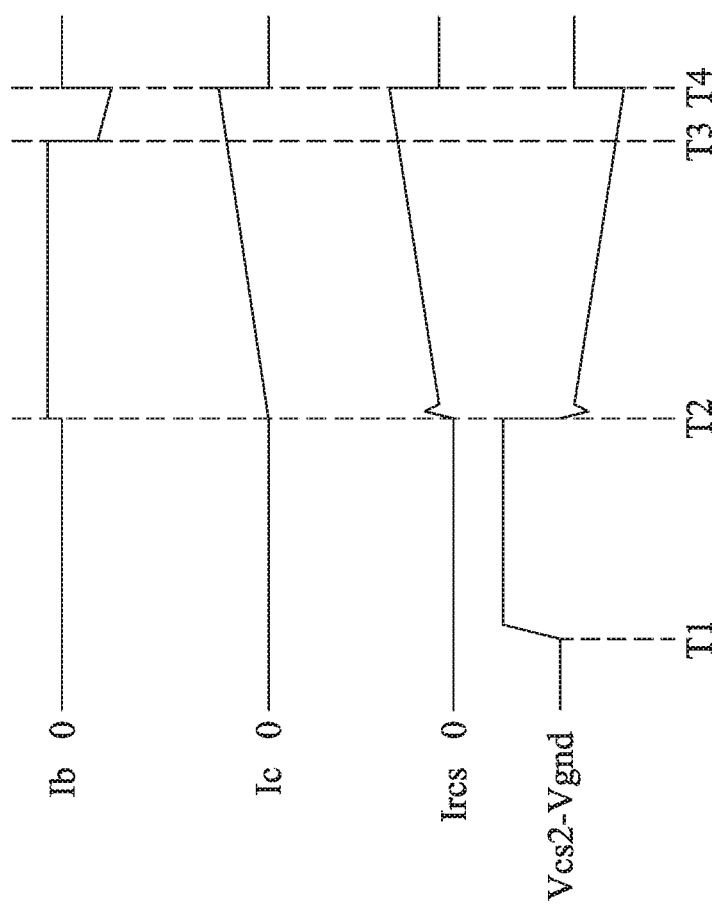
FIG. 10 shows waveforms of the signals shown in FIG. 9.

When the loop controller 42 turns off the switch SW1 and turns on the switch SW2 to turn off the BJT Q1, as shown at time T3 in FIG. 10, the BJT Q1 generates a recovery current Irb that flows from the collector of the BJT Q1 to the sensing resistor Rcs through the base of the BJT Q1 and the switch SW2. Therefore, the current Ircs of the sensing resistor Rcs remains going up with the inductor current Ic. As shown in the period between the time points T2 and T4 in FIG. 10, the waveforms of the current Ircs and of the inductor current Ic are coincident. The control IC 30 is thus enabled to correctly sense the inductor current Ic according to the voltage drop of the sensing resistor Rcs. In other words, the current sensor 44 is enabled to correctly sense the inductor current Ic according to the relative voltage Vcs2−Vgnd.

Figure 11:
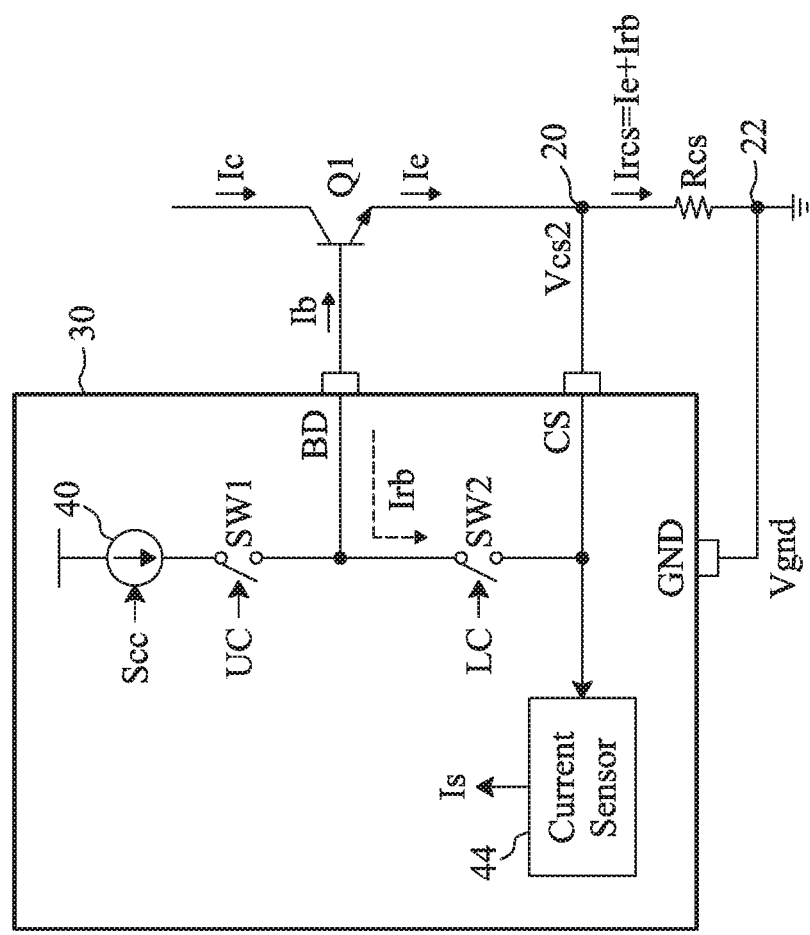
FIG. 11 shows another embodiment for sensing the inductor current Ic.

FIG. 11 is another embodiment for sensing the inductor current Ic, in which a control IC 30 has a pin CS connected to a first terminal 20 of the sensing resistor Rcs, and has a pin GND connected to a second terminal 22 of the sensing resistor Rcs, the switch SW2 is connected between pins BD and CS of the control IC 30, and the voltage Vgnd of the pin GND is the reference potential for the control IC. When the switch SW1 is turned on and the switch SW2 is turned off to make the BJT Q1 on, the output current Ie passes through the sensing resistor Rcs. When the switch SW1 is turned off and the switch SW2 is turned on to make the BJT Q1 off, the recovery current Irb flows from the collector of the BJT Q1 through the base of the BJT Q1 and the switch SW2 to the sensing resistor Rcs. Thus, the current sensor 44 is enabled to correctly sense the inductor current Ic according to the relative voltage Vcs2−Vgnd between the voltage Vcs2 and the voltage Vgnd. In the embodiment, the voltage Vcs2 is greater than the voltage Vgnd, so the relative voltage Vcs2−Vgnd=Ircs×Rcs is a positive voltage.

In the embodiment shown in FIG. 9, the base-current-setting circuit 32 includes a detector 34, a storage unit 36 and a translate circuit 38. The detector 34 detects the resistance value of the current-setting resistor Rset when the AC-to-DC power converter is activated or when the BJT Q1 is off, to generate a detecting signal Sd. The storage unit 36 stores the detecting signal Sd when the AC-to-DC power converter is activated or when the BJT Q1 is off. The translate circuit 38 generates the current-controlling signal Scc for controlling the base current Ibb according to the detecting signal Sd stored in the storage unit 36. Preferably, when the BJT Q1 is on, the translate circuit 38 can immediately adjust the current-controlling signal Scc according to the voltage Vcs2 of the pin CS, to in turn adjust the base current Ibb.

Figure 12:
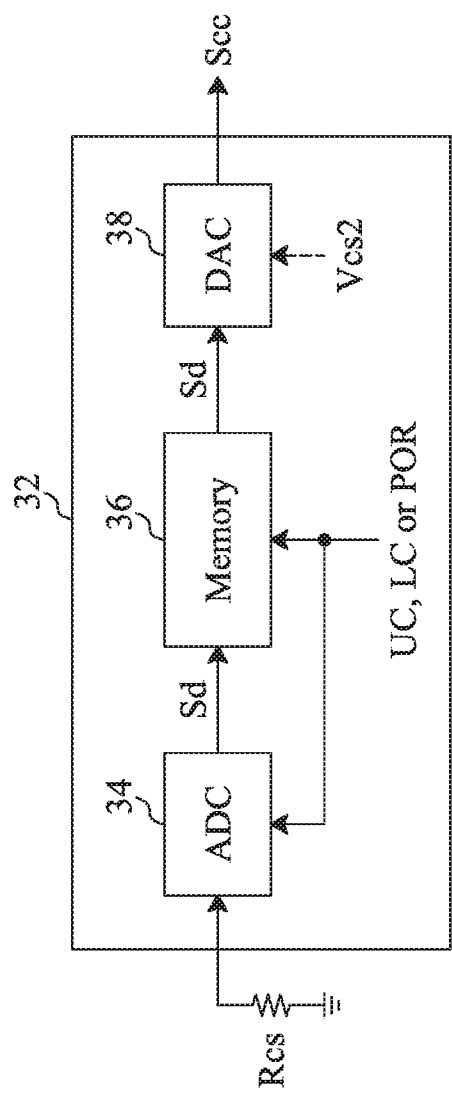
FIG. 12 is a first embodiment of the base-current-setting circuit shown in FIG. 9.

FIG. 12 shows a first embodiment of the base-current-setting circuit 32 shown in FIG. 9, in which an analogy-to-digital converter (ADC) is used as the detector 34 for detecting the resistance value of the current-setting resistor Rset and converting the resistance value into a digital detecting signal Sd, a memory is used as the storage unit 36 for storing the digital detecting signal Sd, and a digital-to-analogy (DAC) is used as the translate circuit 38 for converting the detecting signal Sd stored in the storage unit 36 into an analog current-controlling signal Scc. Preferably, when the BJT Q1 is on, the translate circuit 38 can immediately adjust the current-controlling signal Scc according to the voltage Vcs2 of the pin CS.

Figure 13:
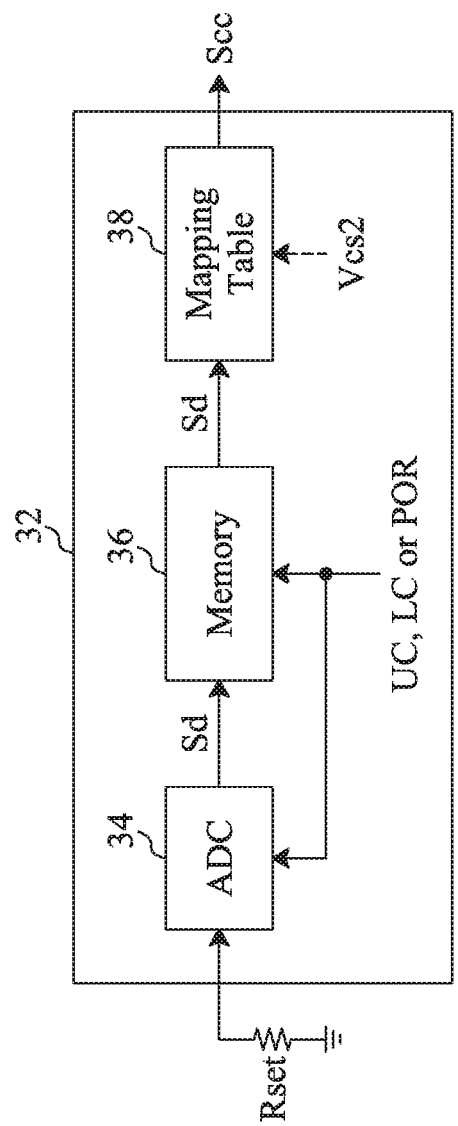
FIG. 13 is a second embodiment of the base-current-setting circuit shown in FIG. 9.

FIG. 13 shows a second embodiment of the base-current-setting circuit 32 of FIG. 9. Similar to the embodiment of FIG. 12, the detector 34 and the storage unit 36 are realized by an ADC and a memory, respectively. However, in the embodiment of FIG. 13, the translate circuit 38 is realized by a mapping table. The translate circuit 38 selects the corresponding current-controlling signal Scc by checking the mapping table according to the detecting signal Sd stored in the memory. Preferably, when the BJT Q1 is on, the translate circuit 38 can immediately adjust the current-controlling signal Scc according to the voltage Vcs2 of the pin CS.

Figure 14:
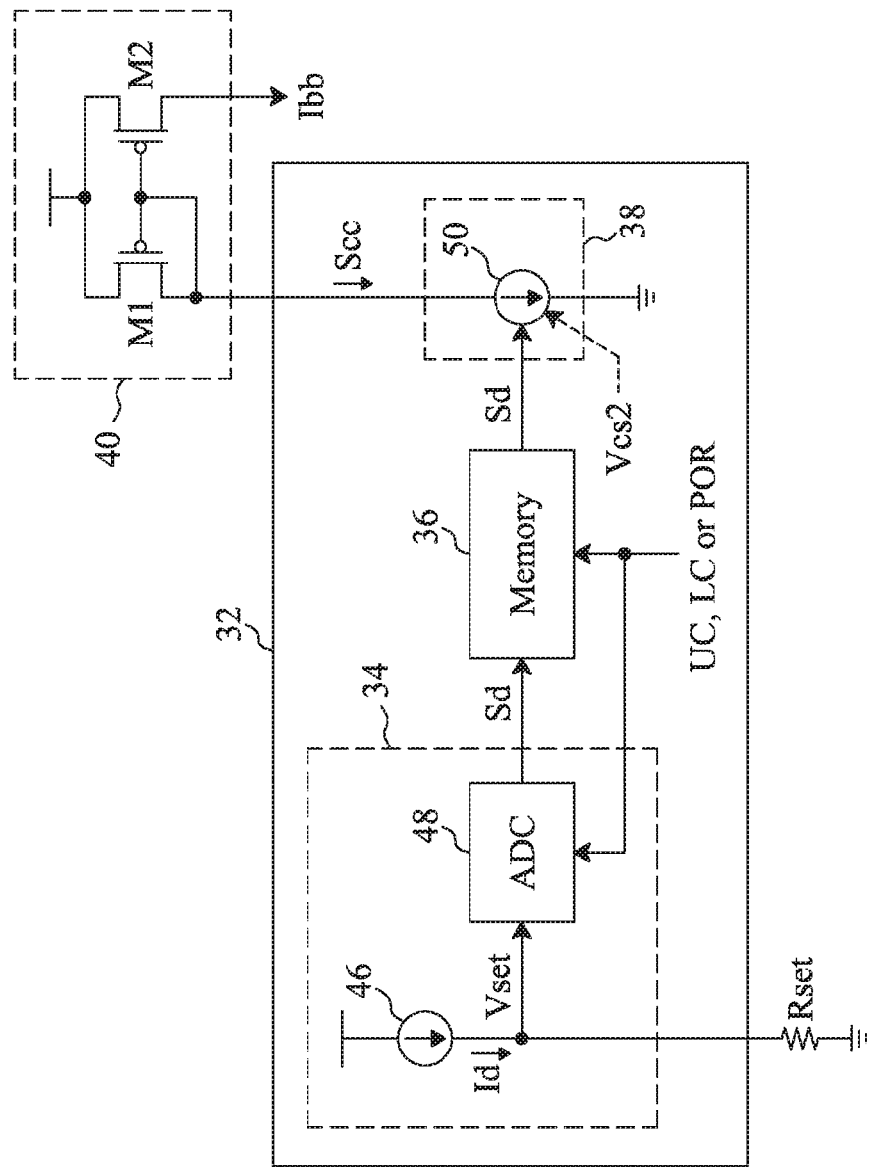
FIG. 14 is a third embodiment of the base-current-setting circuit shown in FIG. 9.

FIG. 14 shows a third embodiment of the base-current-setting circuit 32 shown in FIG. 9, in which the detector 34 includes a current source 46 and an ADC 48. The current source 46 provides a current Id to the current-setting resistor Rset to generate a voltage Vset for determination of the resistance value of the current-setting resistor Rset. The ADC 48 converts the voltage Vset into a digital detecting signal Sd. The memory working as the storage unit 36 stores the detecting signal Sd. The translate circuit 38 includes a current source 50 that provides the current-controlling signal Scc according to the detecting signal Sd. The current source 40 includes a current mirror composed of transistors M1 and M2 for mirroring the current-controlling signal Scc to generate the base current Ibb. Preferably, when the BJT Q1 is on, the current source 50 can immediately adjust the current-controlling signal Scc according to the voltage Vcs2 of the pin CS.

Figure 15:
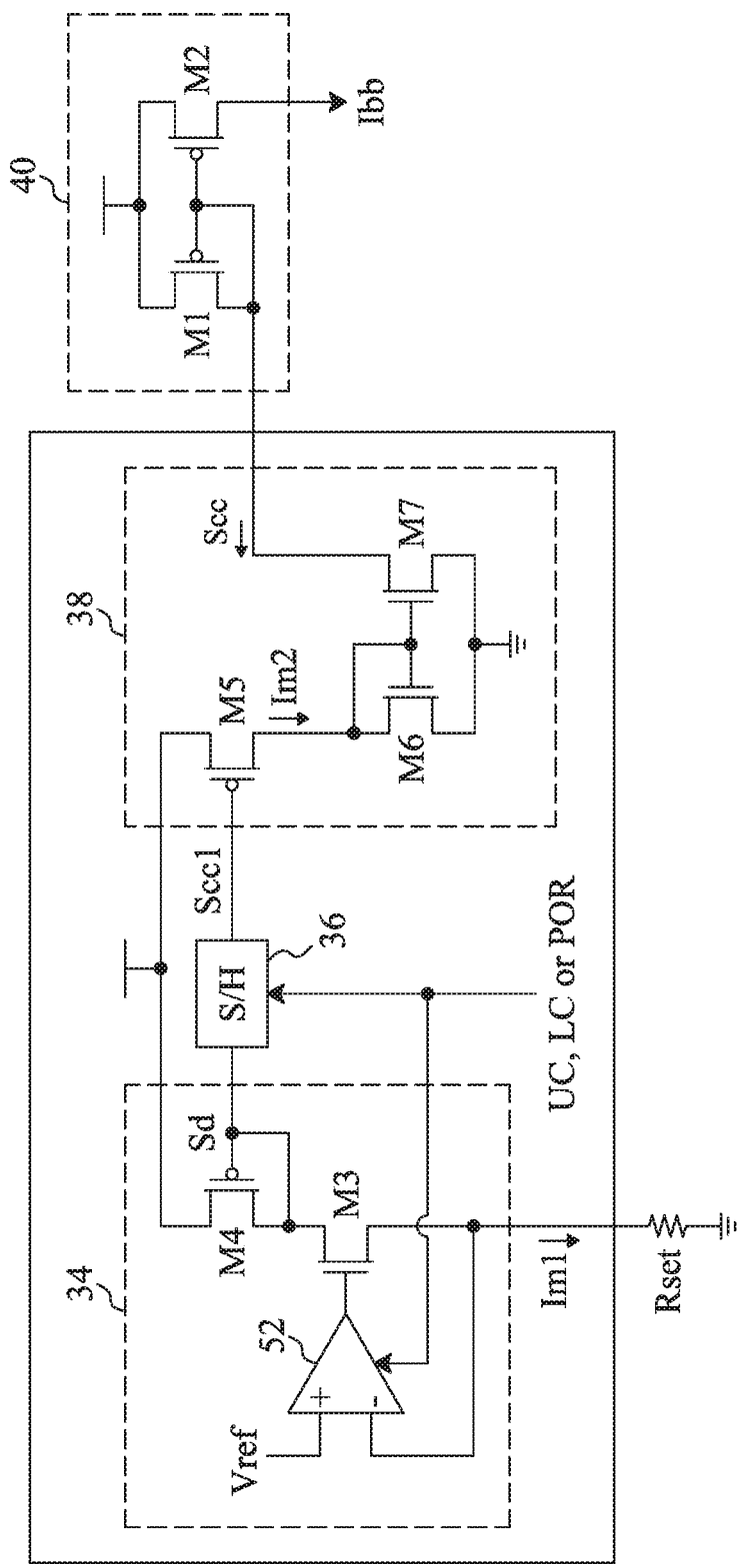
FIG. 15 is a fourth embodiment of the base-current-setting circuit shown in FIG. 9.

FIG. 15 shows a fourth embodiment of the base-current-setting circuit 32 shown in FIG. 9, in which the detector 34 includes an operational amplifier 52 and transistors M3 and M4. The operational amplifier 52 applies a voltage Vref to the current-setting resistor Rset to generate a current Im1 for determination of the resistance value of the current-setting resistor Rset. The current Im1 passes through the transistors M3 and M4 and determines the detecting signal Sd on the gate of the transistor M4. The embodiment of FIG. 15 uses a sample and hold circuit as the storage unit 36 for storing the detecting signal Sd. In FIG. 15, the translate circuit 38 includes transistors M5, M6 and M7. The storage unit 36 provides the detecting signal Sd to the gate of the transistor M5. Since the transistors M4 and M5 have the same gate voltage, they form a current mirror to mirror the current Im1 to generate a current Im2. The transistors M6 and M7 of the translate circuit 38 also form a current mirror to mirror the current Im2 to generate the current-controlling signal Scc. The current source 40 includes a current mirror composed of transistors M1 and M2 to mirror the current-controlling signal Scc, thereby generating the base current Ibb.

In the embodiments of FIG. 12 through FIG. 15, the detector 34 and the storage unit 36 may detect the current-setting resistor Rset and store the detecting signal Sd according to the power-on-resetting signal POR when the AC-to-DC power converter is activated. Alternatively, they may detect the current-setting resistor Rset and store the detecting signal Sd according to the control signal UC or LC when every time the BJT Q1 is off.

Figure 16:
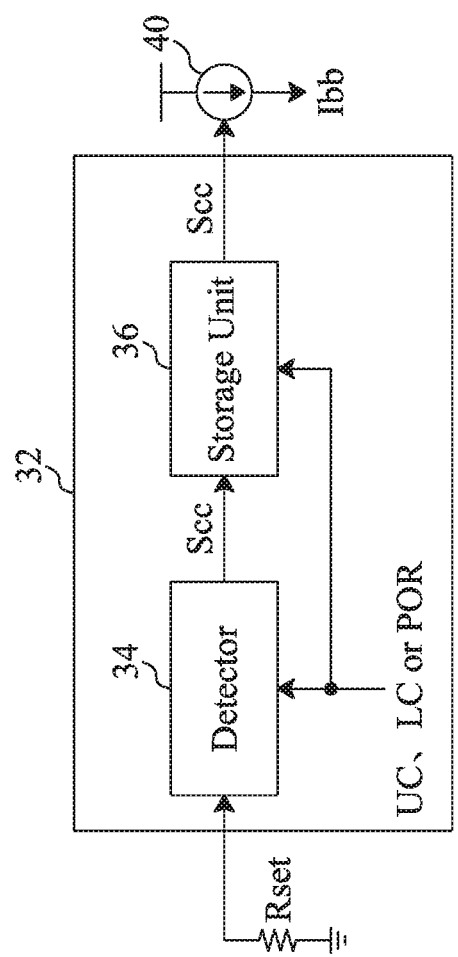
FIG. 16 is another configuration of the base-current-setting circuit.

FIG. 16 provides another configuration of the base-current-setting circuit 32, which includes a detector 34 and a storage unit 36. The detector 34 detects the resistance value of the current-setting resistor Rset to generate the current-controlling signal Scc. The storage unit 36 stores the current-controlling signal Scc and provides the current-controlling signal Scc to the current source 40 to control the base current Ibb. The detector 34 is as shown in FIG. 12 through FIG. 15. The storage unit 36 may be a memory or a sample and hold circuit. In FIG. 16, the detector 34 and the storage unit 36 may detect the current-setting resistor Rset and store the current-controlling signal Scc according to the power-on-resetting signal POR when the AC-to-DC power converter is activated. Alternatively, they may detect the current-setting resistor Rset and store the current-controlling signal Scc according to the control signal UC or LC when every time the BJT Q1 is off.

Figure 17:
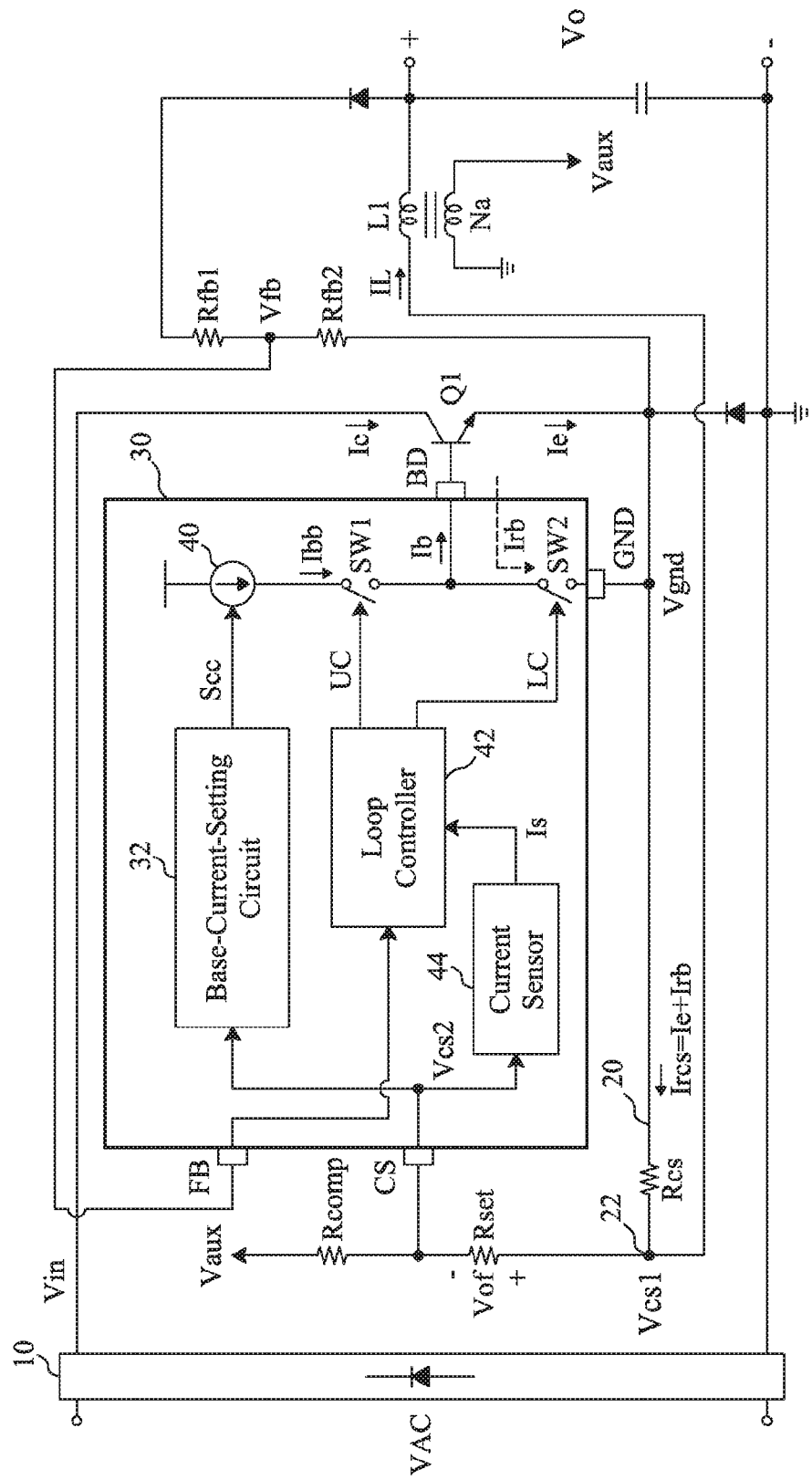
FIG. 17 is a buck AC-to-DC power converter according to the present invention.

In addition to the fly-back AC-to-DC power converter as shown in FIG. 9, the present invention is also applicable to a buck or boost AC-to-DC power converter. FIG. 17 shows a buck AC-to-DC power converter according to the present invention, in which a rectifier circuit 10 rectifies an AC voltage VAC to generate an input voltage Vin, and a control IC 30 has a pin BD connected to the base of the BJT Q1 for switching the BJT Q1 to converter the input voltage Vin into an output voltage Vo. The control IC 30 operates as the circuit of FIG. 9 does. The base-current-setting circuit 32 generates the current-controlling signal Scc for the current source 40 by detecting the resistance value of the current-setting resistor Rset, to in turn determine the base current Ibb. When the switch SW1 is turned on and the switch SW2 is turned off, the current Ibb is provided to the base of the BJT Q1, to turn on the BJT Q1. When the BJT Q1 is on, the current Ircs=Ie+Irb passes through the sensing resistor Rcs. The control IC 30 takes the voltage Vgnd at the first terminal 20 of the sensing resistor Rcs as the reference potential. The auxiliary coil Na senses the voltage of the inductor L1 to generate a voltage Vaux. Resistors Rcomp and Rset divide the voltage Vaux to generate a voltage drop Vof on the resistor Rset for compensating the delay time Td. The voltage drop Vof of the resistor Rset shifts the voltage Vcs1 at the second terminal 22 of the resistor Rcs to generate a voltage Vcs2 for pin CS. In the control IC 30, the current sensor 44 generates the current-sensing signal Is according to the relative voltage Vcs2−Vgnd between the voltage Vcs2 and the voltage Vgnd. Since the voltage of the inductor L1 varies with the input voltage Vin, the voltage drop Vof of the resistor Rset also varies with the input voltage Vin, thereby allowing the inductor current IL to have the same peak even if the input voltage Vin varies. When the switch SW1 is turned off and the switch SW2 is turned on, the BJT Q1 is turned off. At the same time the BJT Q1 generates a recovery current Irb that flows from the collector to the sensing resistor Rcs through the base and the switch SW2. Thus, the waveform of the current Ircs of the sensing resistor Rcs concerts with the going-up waveform of the inductor current IL. The control IC 30 thus can obtain the going-up waveform of the inductor current IL by referring to the voltage drop of the sensing resistor Rcs.

Figure 18:
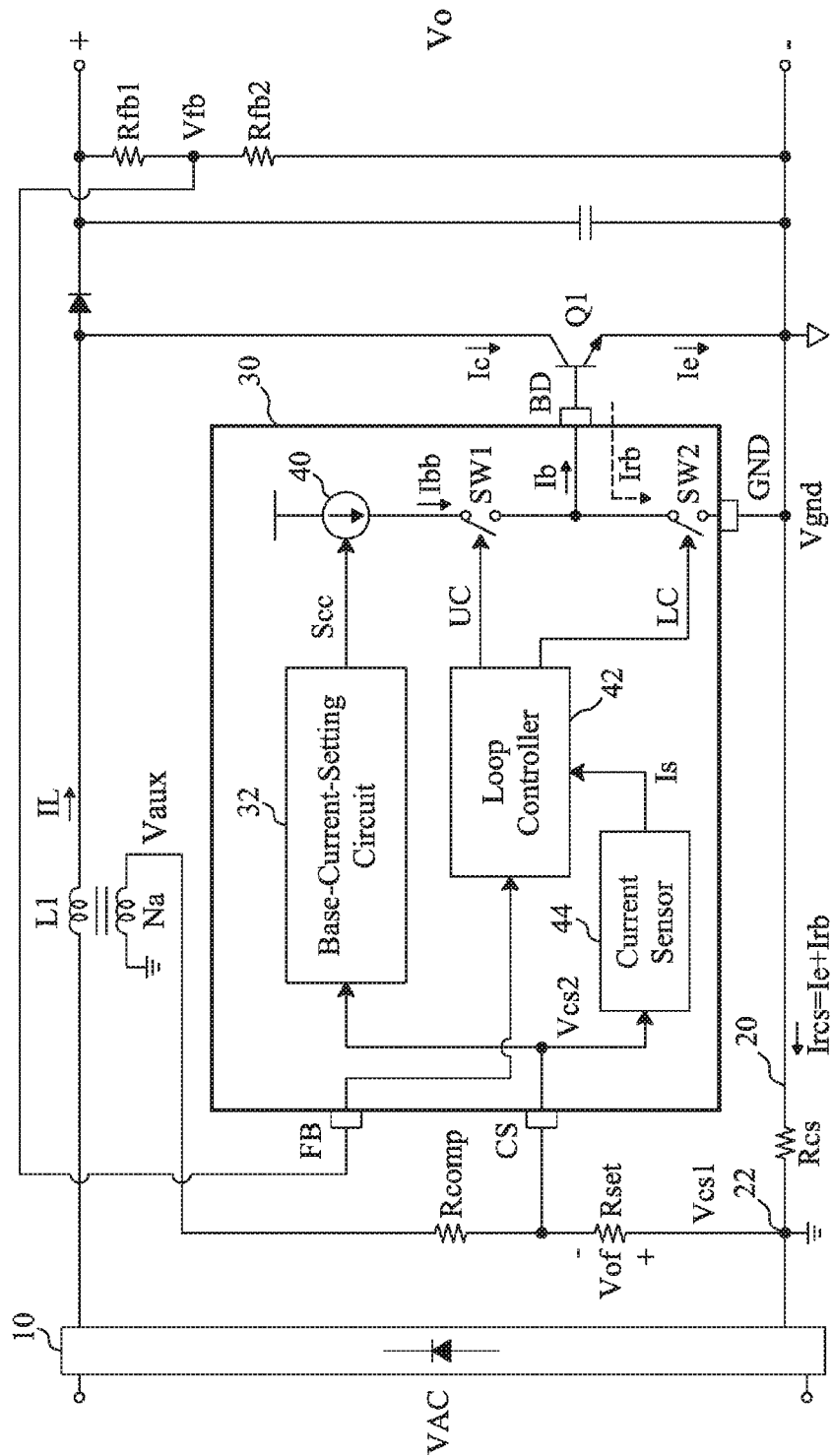
FIG. 18 is a boost AC-to-DC power converter according to the present invention.

FIG. 18 shows a boost AC-to-DC power converter according to the present invention, in which a rectifier circuit 10 rectifies an AC voltage VAC to generate an input voltage Vin, and a control IC 30 has a pin BD connected to the base of a BJT Q1 for switching the BJT Q1 to convert the input voltage Vin into an output voltage Vo. The control IC 30 operates as the circuit of FIG. 9 does, in which the base-current-setting circuit 32 generates the current-controlling signal Scc for the current source 40 by detecting the resistance value of the current-setting resistor Rset, in turn determining the base current Ibb. When the switch SW1 is turned on and the switch SW2 is turned off, the base current Ibb is provided to the base of the BJT Q1 to turn on the BJT Q1. When the BJT Q1 is on, the current Ircs=Ie+Irb passes through the sensing resistor Rcs. The control IC 30 takes the voltage Vgnd at the first terminal 20 of the sensing resistor Rcs as the reference potential. The auxiliary coil Na senses the voltage of the inductor L1 to generate a voltage Vaux. Resistors Rcomp and Rset divide the voltage Vaux to generate a voltage drop Vof on the resistor Rset for compensating the delay time Td. The voltage drop Vof of the resistor Rset shifts the voltage Vcs1 at the second terminal 22 of the resistor Rcs to generate a voltage Vcs2 for the pin CS. In the control IC 30, the current sensor 44 generates the current-sensing signal Is according to the relative voltage Vcs2−Vgnd between the voltage Vcs2 and the voltage Vgnd. Since the voltage of the inductor L1 varies with the input voltage Vin, the voltage drop Vof of the resistor Rset also varies with the input voltage Vin, thereby allowing the inductor current IL to have the same peak even if the input voltage Vin varies. When the switch SW1 is turned off and the switch SW2 is turned on to turn off the BJT Q1, the BJT Q1 generates a recovery current Irb that flows from the collector to the sensing resistor Rcs through the base and the switch SW2. Thus, the waveform of the current Ircs of the sensing resistor Rcs concerts with the going-up waveform of the inductor current IL. The control IC 30 thus can obtain the going-up waveform of the inductor current IL by referring to the voltage drop of the sensing resistor Rcs.

In the above embodiments, while description is made to the AC-to-DC power converter using BD technique, it is noted that the use of the present invention is not limited to AC-to-DC power converters using BD technique. People skilled in the art would be enabled by the disclosure herein to easily apply the present invention to any AC-to-DC power converter using ED technique. In addition, while the base-current-setting circuit 32 sets the base current Ibb by using the pin CS that senses the inductor current Ic in the above embodiments, the base-current-setting circuit 32 may use a pin having a different function or use an additional unoccupied pin to set the base current Ibb in other embodiments.

Figure 19:
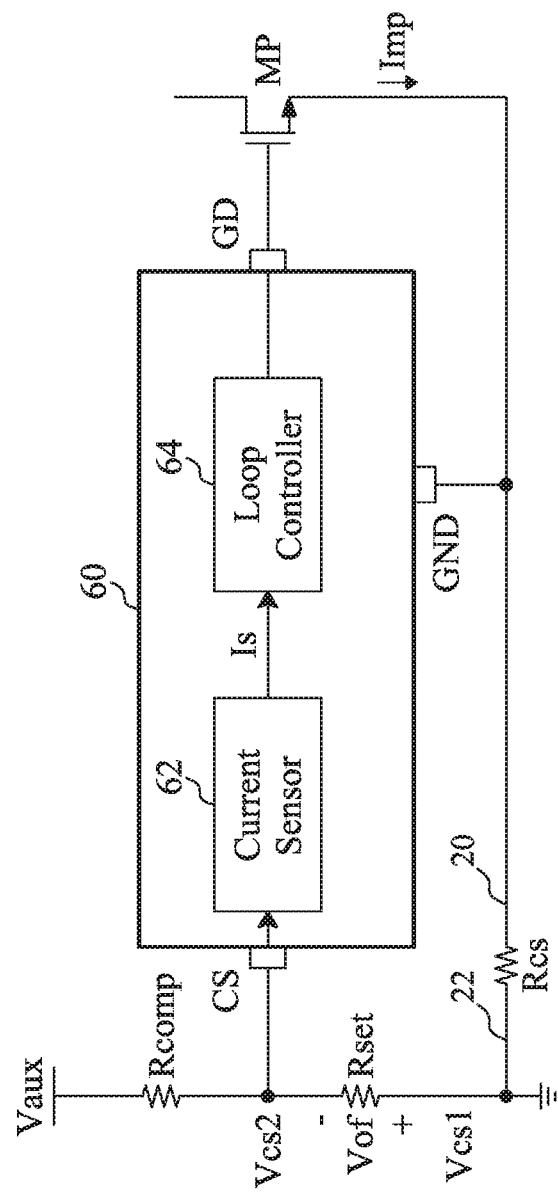
FIG. 19 is a power converter using a MOSFET as its power switch.

In a power converter using a MOSFET as its power switch, the delay time Td can also happen. The method of delay-time compensation disclosed in the present invention is also applicable to this kind of power converters. FIG. 19 shows a power converter using a MOSFET as its power switch, in which a loop controller 64 is connected to the gate of the MOSFET Mp through the pin GD of the control IC 60 to switch the MOSFET Mp, a sensing resistor Rcs has its first terminal 20 connected to the pin GND of the control IC 60 and the output terminal of the MOSFET Mp, and serially-connected resistors Rcomp and Rset are connected to the second terminal 22 of the sensing resistor Rcs, to divide the voltage Vaux and generate a voltage drop Vof on the resistor Rset. The voltage drop Vof of the resistor Rset shifts the voltage Vcs1 at the second terminal 22 of the resistor Rset to generate a voltage Vcs2 for the pin CS of the control IC 60. The current sensor 62 triggers the current-sensing signal Is at an earlier time point according to the shifted voltage Vcs2, to compensate the delay time Td. Preferably, the voltage Vaux may vary with the input voltage Vin to prevent the peak of the current Imp of the MOSFET Mp from varying with the input voltage Vin.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An AC-to-DC power converter comprising:
    a rectifier circuit configured to operably rectify an AC voltage to generate an input voltage;
    a bipolar junction transistor connected to the rectifier circuit, and, configured to operably, when being on, have an output terminal thereof providing an output current;
    an inductor connected to the bipolar junction transistor;
    a current-setting resistor; and
    a control integrated circuit having a first pin connected to the bipolar junction transistor and configured to operably switch the bipolar junction transistor, and having a second pin connected to the current-setting resistor, wherein the control integrated circuit includes:
        a base-current-setting circuit connected to the second pin, and configured to operably detect a resistance value of the current-setting resistor to generate a current-controlling signal; and
        a current source connected to the base-current-setting circuit, and, configured to operably, when the bipolar junction transistor is on, generate a base current for a base of the bipolar junction transistor according to the current-controlling signal.

2. The AC-to-DC power converter as recited in claim 1, further comprising a sensing resistor that has a first terminal connected to a third pin of the control integrated circuit and a second terminal connected to the second pin through the current-setting resistor, wherein the sensing resistor is configured to operably determine a voltage of the third pin according to the output current and a recovery current of the bipolar junction transistor, and the voltage of the third pin is used to determine a reference potential for the control integrated circuit.

3. The AC-to-DC power converter as recited in claim 2, wherein the control integrated circuit further comprising a current sensor connected to the second pin, and configured to operably determine a value of an inductor current on the inductor according to a relative voltage between the second pin and the third pin, and generate a current-sensing signal when the relative voltage reaches a predetermined threshold to turn off the bipolar junction transistor.

4. The AC-to-DC power converter as recited in claim 3, wherein a voltage of the second pin is equal to a sum of a voltage drop in the current-setting resistor and a voltage at the second terminal of the sensing resistor.

5. The AC-to-DC power converter as recited in claim 4, wherein the voltage drop in the current-setting resistor varies with the input voltage when the inductor current is raising.

6. The AC-to-DC power converter as recited in claim 1, wherein the base-current-setting circuit is configured to operably detect the resistance value of the current-setting resistor when the AC-to-DC power converter is activated to generate and store the current-controlling signal.

7. The AC-to-DC power converter as recited in claim 1, wherein the base-current-setting circuit is configured to operably detect the resistance value of the current-setting resistor when the bipolar junction transistor is turned off to generate and store the current-controlling signal.

8. An AC-to-DC power converter comprising:
    a rectifier circuit configured to operably rectify an AC voltage to generate an input voltage;
    a power switch connected to the rectifier circuit;
    an inductor connected to the power switch;
    a sensing resistor connected to the power switch, and configured to operably, according to a current of the power switch, generate a first voltage at a first terminal thereof and generate a second voltage at a second terminal thereof;
    a shifting circuit connected to the second terminal of the sensing resistor, and configured to operably provide a third voltage to shift the second voltage to generate a fourth voltage; and
    a control integrated circuit having a first pin connected to the power switch and configured to operably switch the power switch, a second pin connected to the first terminal of the sensing resistor, and a third pin connected to the shifting circuit and configured to operably, according to a relative voltage between the first voltage and the fourth voltage, determine an inductor current of the inductor.

9. The AC-to-DC power converter as recited in claim 8, wherein the power switch comprises a MOSFET.

10. The AC-to-DC power converter as recited in claim 8, wherein the power switch comprises a bipolar junction transistor.

11. The AC-to-DC power converter as recited in claim 10, wherein when the bipolar junction transistor is turned off, a recovery current thereof passes through the sensing resistor.

12. The AC-to-DC power converter as recited in claim 8, wherein the third voltage varies with the input voltage.

13. The AC-to-DC power converter as recited in claim 8, wherein the shifting circuit comprises:
an auxiliary coil configured to operably sense the input voltage to generate a fifth voltage;
a first resistor connected between the auxiliary coil and the third pin; and
a second resistor connected between the third pin and the second terminal of the sensing resistor, wherein the first resistor and the second resistor are configured to operably divide a voltage difference between the fifth voltage and the second voltage to generate the third voltage;
wherein a resistance ratio between the first resistor and the second resistor determines the third voltage and in turn the fourth voltage.

14. A control integrated circuit of an AC-to-DC power converter, the control integrated circuit configured to operably serve to switch a bipolar junction transistor to control an inductor current on an inductor and comprising:
a pin configured to operably connect to a current-setting resistor;
a base-current-setting circuit connected to the pin, and configured to operably detect a resistance value of the current-setting resistor connected to the pin to generate a current-controlling signal; and
a current source connected to the base-current-setting circuit, and configured to operably, when the bipolar junction transistor is on, generate a base current for a base of the bipolar junction transistor according to the current-controlling signal.

15. The control integrated circuit as recited in claim 14, wherein the base-current-setting circuit is configured to operably detect the resistance value of the current-setting resistor connected to the pin when the AC-to-DC power converter is activated to generate and store the current-controlling signal.

16. The control integrated circuit as recited in claim 14, wherein the base-current-setting circuit is configured to operably detect the resistance value of the current-setting resistor connected to the pin when the bipolar junction transistor is turned off to generate and store the current-controlling signal.

17. The control integrated circuit as recited in claim 14, further comprising a current sensor connected to the pin, and configured to operably determine a value of the inductor current according to a relative voltage between voltage of the pin and a reference potential for the control integrated circuit, and, when the relative voltage reaches a predetermined threshold, generate a current-sensing signal to turn off the bipolar junction transistor.

18. A control method of an AC-to-DC power converter, the AC to-DC power converter including a rectifier circuit configured to operably rectify an AC voltage to generate an input voltage and a control integrated circuit configured to operably switch a bipolar junction transistor to control an inductor current of an inductor, the control method comprising the steps of: detecting a resistance value of a current-setting resistor to generate a current-controlling signal; and determining a base current provided to the bipolar junction transistor according to the current-controlling signal wherein the control integrated circuit having a first pin connected to the bipolar junction transistor and configured to operably switch the bipolar junction transistor, and the control integrated circuit having a second pin connected to the current-setting resistor,
wherein the control integrated circuit includes: a base-current-setting circuit connected to the second pin and configured to operably detect a resistance value of the current-setting resistor to generate a current-controlling signal; and a current source connected to the base-current-setting circuit, and, configured to operably, when the bipolar junction transistor is on, generate a base current for a base of the bipolar junction transistor according to the current-controlling signal.

19. The control method as recited in claim 18, wherein the step of detecting a resistance value of a current-setting resistor to generate a current-controlling signal comprises the step of detecting the resistance value of the current-setting resistor when the AC-to-DC power converter is activated to generate and store the current-controlling signal.

20. The control method as recited in claim 18, wherein the step of detecting a resistance value of a current-setting resistor to generate a current-controlling signal comprises the step of detecting the resistance value of the current-setting resistor when the bipolar junction transistor is turned off to generate and store the current-controlling signal.

21. The control method as recited in claim 18, further comprising the step of adjusting the current-controlling signal according to a voltage of the current-setting resistor when the bipolar junction transistor is on.

22. The control method as recited in claim 18, further comprising the steps of:
when the bipolar junction transistor is on, providing an output current at an output terminal of the bipolar junction transistor to a sensing resistor, to generate a first voltage and a second voltage at a first terminal and a second terminal of the sensing resistor, respectively;
providing a third voltage to shift the second voltage to generate a fourth voltage;
determining an inductor current according to a relative voltage between the first voltage and the fourth voltage;
turning off the bipolar junction transistor when the relative voltage reaches a predetermined threshold; and
providing a recovery current of the bipolar junction transistor to the sensing resistor when the bipolar junction transistor is turned off.

23. The control method as recited in claim 22, further comprising the step of using the current-setting resistor to provide the third voltage.

24. The control method as recited in claim 22, further comprising the step of providing the third voltage varying with the input voltage.

25. The control method as recited in claim 22, wherein the step of providing the third voltage to shift the second voltage to generate the fourth voltage comprises the steps of:
sensing the input voltage by an auxiliary coil to generate a fifth voltage; and
using a pair of resistors electrically in series connected between the auxiliary coil and the second terminal of the sensing resistor to divide a voltage difference between the fifth voltage and the second voltage to generate the third voltage for shifting the second voltage and in turn generating the fourth voltage;

wherein a resistance ratio between the pair of resistors determines the third voltage to determine the fourth voltage.

26. A control method of an AC-to-DC power converter, the AC-to-DC power converter including a rectifier circuit configured to operably rectify an AC voltage to generate an input voltage and a control integrated circuit configured to operably switch a power switch to control an inductor current of an inductor, the control method comprising the steps of:

when the power switch is on, providing an output current at an output terminal of the power switch to a sensing resistor, to generate a first voltage and a second voltage at a first terminal and a second terminal of the sensing resistor, respectively;

providing a third voltage for shifting the second voltage to generate a fourth voltage;

determining the inductor current according to a relative voltage between the first voltage and the fourth voltage; and turning off the power switch when the relative voltage reaches a predetermined threshold.

27. The control method as recited in claim 26, further comprising the step of using a MOSFET as the power switch.

28. The control method as recited in claim 26, further comprising the step of using a bipolar junction transistor as the power switch.

29. The control method as recited in claim 28, further comprising the step of providing a recovery current of the bipolar junction transistor to the sensing resistor when the bipolar junction transistor is turned off.

30. The control method as recited in claim 26, further comprising the step of providing the third voltage that varies with the input voltage.

31. The control method as recited in claim 26, wherein the step of providing a third voltage for shifting the second voltage to generate a fourth voltage comprises the steps of:

sensing the input voltage by an auxiliary coil to generate a fifth voltage; and dividing a voltage difference between the fifth voltage and the second voltage by a pair of resistors connected in series between the auxiliary coil and the second terminal of the sensing resistor, to generate the third voltage for shifting the second voltage and in turn generating the fourth voltage;

wherein a resistance ratio between the pair of resistors determines the third voltage and in turn the fourth voltage.

* * * * *